(12) United States Patent
Kraemer et al.

(10) Patent No.: US 11,614,167 B2
(45) Date of Patent: Mar. 28, 2023

(54) PARKING LOCK AND METHOD FOR THE ASSEMBLY THEREOF

(71) Applicant: Schaeffler Technologies AG & Co. KG, Herzogenaurach (DE)

(72) Inventors: Klaus Kraemer, Lenkersheim (DE); Matthias Feuerbach, Würzburg (DE); Markus Rost, Herzogenaurach (DE); Tobias Heumann, Arberg (DE); Christoph Thuerauf, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 42 days.

(21) Appl. No.: 17/288,024

(22) PCT Filed: Nov. 21, 2019

(86) PCT No.: PCT/DE2019/100999
§ 371 (c)(1),
(2) Date: Apr. 23, 2021

(87) PCT Pub. No.: WO2020/103981
PCT Pub. Date: May 28, 2020

(65) Prior Publication Data
US 2021/0396310 A1 Dec. 23, 2021

(30) Foreign Application Priority Data

Nov. 21, 2018 (DE) ..................... 10 2018 129 317.8
Nov. 28, 2018 (DE) ..................... 10 2018 130 077.8
Dec. 7, 2018 (DE) .......................... 202018006325.8

(51) Int. Cl.
*F16H 63/34* (2006.01)
*B60T 1/00* (2006.01)

(52) U.S. Cl.
CPC .......... *F16H 63/3425* (2013.01); *B60T 1/005* (2013.01); *F16H 63/3416* (2013.01)

(58) Field of Classification Search
CPC .. F16H 63/34; F16H 63/3416; F16H 63/3425; F16H 63/3458; B60T 1/005; B60T 1/062
(Continued)

(56) References Cited

U.S. PATENT DOCUMENTS 3,213,968 A * 10/1965 Platz ................... F16H 63/3416
188/69
3,690,416 A * 9/1972 Yamada .................. B60T 1/005
188/69
(Continued)

FOREIGN PATENT DOCUMENTS

CN 103930319 A 7/2014
CN 104534087 4/2015
(Continued)

*Primary Examiner* — Richard M Lorence

(57) ABSTRACT

A parking lock has a parking lock housing (20), a locking pawl (12) which has a ratchet (16) that can be locked in a parking lock wheel (56) and a pawl profile (44) arranged on the rear side of the ratchet (16), an actuating unit (24) which acts upon the pawl profile (44) when the parking lock (10) is engaged and thereby rotates the locking pawl (12) about a rotational axis (14) relative to the parking lock housing (20), and a supporting element (18), on which the actuating unit (24) is supported in the engaged state (P) and in the disengaged state (nP) of the parking lock (10) at different positions. The supporting element (18) is connected to the parking lock housing (20) so as to have play.

16 Claims, 3 Drawing Sheets

(58) Field of Classification Search
USPC .................................................... 192/219.5
See application file for complete search history.

(56) References Cited

U.S. PATENT DOCUMENTS

| | | | | |
|---|---|---|---|---|
| 7,556,135 | B2* | 7/2009 | Kasuya | ................... B60T 1/062 |
| | | | | 192/219.5 |
| 8,240,448 | B2* | 8/2012 | Hongawara | ......... F16H 63/3416 |
| | | | | 192/219.5 |
| 2011/0278132 | A1 | 11/2011 | Dopfert et al. | |
| 2012/0018259 | A1 | 1/2012 | Prix | |

FOREIGN PATENT DOCUMENTS

| | | |
|---|---|---|
| DE | 19933618 | 1/2001 |
| DE | 10144058 | 3/2003 |
| DE | 10144063 | 3/2003 |
| DE | 102008054466 | 6/2010 |
| DE | 102010000774 | 7/2011 |
| DE | 102017127358 | 5/2018 |

\* cited by examiner

PARKING LOCK AND METHOD FOR THE ASSEMBLY THEREOF

CROSS-REFERENCE TO RELATED APPLICATIONS

This application is the U.S. National Phase of PCT Appln. No. PCT/DE2019/100999 filed Nov. 21, 2019, which claims priority to DE 202018006325.8 filed Dec. 7, 2018, DE 10 2018 130 077.8 filed Nov. 28, 2018, and DE 10 2018 129 317.8 filed Nov. 21, 2018, the entire disclosures of which are incorporated by reference herein.

TECHNICAL FIELD

The disclosure relates to a parking lock, a method for the assembly thereof, and a transmission having such a parking lock.

BACKGROUND

A parking lock is known for example from DE 101 44 063 A1. This describes a parking lock in an automatic transmission of a motor vehicle which has a locking ring having locking recesses arranged on a transmission shaft. A pawl is brought into engagement with the locking recesses by means of a pivotable selector lever and a linkage linked thereto when the device is in the locked state. The linkage has rollers at the end thereof, of which a second roller guides the linkage in an L-shaped guide plate. The guide plate is fastened in the housing of the automatic transmission. The second roller rolls on the guide plate when the linkage moves longitudinally. The guide plate thus comprises a side wall and a horizontally running wall. The horizontally running wall of the guide plate has elongated holes. The side wall of the guide plate is a separate component and has crenelated projections on one edge. These projections are matched in terms of the dimensions thereof to the elongated holes in the horizontally running wall and can engage in the openings in the horizontal wall by means of a press fit.

Further parking locks are known from CN 104 534 087 A and DE 101 44 058. The latter shows a generic parking lock. The parking lock having the locking pawl and the actuating unit is fixedly mounted to the transmission housing so that the parking lock wheel arranged on the drive train can be supported. The different fastening reference points result in tolerances that must be compensated. In particular, due to the manufacturing process, dimensional fluctuations occur between the centering bores in the housing and the contact surface of the actuating unit moving the locking pawl. Adjustments must therefore always be carried out when installing the parking lock to position the pawl exactly in relation to the parking lock wheel. A shifting of the adjustment work from the parking lock wheel/pawl interface to the locking pawl-actuating mechanism interface of the locking pawl, for example an electric motor, is conceivable, but leads to the disadvantage that the parking lock having the actuators thereof cannot be provided as a prefabricated module, which increases the installation effort.

SUMMARY

It is desirable to improve a parking lock and to avoid the disadvantages mentioned above. A further object is to provide a transmission having a parking lock of this type and a simpler assembly method for a parking lock.

The parking lock has a supporting element which is connected to the parking lock housing so as to have play. The arrangement of the supporting element so as to have play makes it possible to shift the necessary adjustment work from the interface between the locking pawl and the parking lock wheel to the parking lock itself. The play is chosen so that the typically occurring manufacturing tolerances can be compensated by the play. The "floating" arrangement of the supporting element within limits consequently introduces an additional degree of freedom that enables internal compensation of the manufacturing tolerances. The self-adjusting, automatic alignment of the supporting element enables the entire parking lock to be assembled as a prefabricated unit without needing to compensate for manufacturing inaccuracies during assembly.

Even more so, it is also possible through this self-adjustment that the parking lock can be installed in the operating position nP because tolerance compensation can also take place when the parking lock pawl is actuated.

The concept can be applied to a supporting element which is supported directly or indirectly on a parking lock housing, so that the compensation takes place within the parking lock module. This makes the parking lock particularly easy to install and enables pre-assembly as a module. The module itself can later be mounted on the transmission without compensation for play.

The support of the supporting element is also provided directly or indirectly via another component on the transmission housing. In the latter case, there is no need for a parking lock housing. Installation is possible in position P as well as in position nP and in any intermediate position. A trial engagement of the parking lock, which proves the suitability of the tolerance settings otherwise required during assembly, can be omitted so that a higher cycle time can be achieved.

The supporting element can be designed as a raceway plate. Thus, on the one hand, it is particularly easy to manufacture and, on the other hand, it can be hardened and/or coated. As a steel insert, it enables reliable force support even in the event that other parts of the parking lock or the transmission housing should be made of aluminum or plastic. The raceway plate can be easily produced from strip material by cutting it to length and can be accommodated on the parking lock housing via the edges thereof.

To receive the supporting element, receptacles are provided, such as elongated holes in which the supporting element is arranged so as to have play, for example. For this purpose, the supporting element can have its own receiving elements, such as lugs, via which a guide in the parking lock housing or in the transmission housing is ensured.

The play provided can be provided in two or even three degrees of freedom to enable pivoting, tilting, and pitching. The play is preferably only made possible in one direction of movement. In particular, it is provided that only the play in the radial direction with respect to the parking lock wheel is compensated, and that there is almost no play in the other directions.

The parking lock has a parking lock housing. The parking lock housing need not enclose the parking lock from several sides. Rather, it is sufficient that the parking lock housing holds the supporting element. It can also take on other functions. For example, it can guide the actuating unit, store the locking pawl and/or receive a return spring for the locking pawl.

The locking pawl is a pawl that is movable about a pivot point and has a ratchet at the end thereof facing away from the pivot point, by means of which the locking pawl can be locked in a form-fitting manner in a tooth profile arranged on the parking lock wheel. On the side facing away from the ratchet radially from the parking lock wheel, the locking pawl has a pawl back having a pawl profile that is acted upon by an actuating unit when the parking lock is engaged. The pawl profile can form a profile in the narrower sense that it is designed as a set of profile peaks. In one variant, the pawl profile is a flat surface.

The externally introduced force for actuating the parking lock is transmitted to the locking pawl by means of the actuating unit. Thus, the actuating unit preferably moves linearly in one direction; as a rule, this direction is approximately parallel to that of the locking pawl in the engaged state thereof. This results in a particularly compact parking lock.

In most cases, the actuating unit is spring-loaded so that the parking lock can be triggered automatically in the event of an electrical malfunction. Often the actuating unit has a carriage that holds one or a plurality of rollers. These roll off the pawl profile with little friction when the parking lock is engaged or disengaged. In the case of a plurality of rollers, these can be arranged in such a way that they roll off one another when they move. For this purpose, they can be arranged radially one above the other.

The actuating unit is supported on the one hand on the pawl profile and on the other hand from the supporting element. It is preferably supported thereon at all times, in the engaged state (P) and in the disengaged state (nP). In a further embodiment it is provided that the actuating unit is supported in different positions on the supporting element in the engaged state (P) and in the disengaged state (nP). To this end, when it is actuated, it can roll or slide on the supporting element, depending on the mounting. The arrangement of the supporting element so as to have play ensures that the actuating unit contacts the supporting element in every state. The supporting element may be spring-loaded, so that it is still connected to the parking lock housing or the transmission housing so as to have play, but always assumes a defined position.

The supporting element can be radially displaceable. It is also possible for it to have play in a rotating or tilting direction.

The supporting element can have a plurality of lugs by means of which it is held in complementary lug receptacles. The lug receptacles and the lugs can be the same or different from one another.

The vehicle can be a motor vehicle. The vehicle can be a hybrid vehicle or an electric vehicle. The vehicle can have a drive train having a transmission. The transmission can be installed in an e-axle. The transmission can be a dedicated hybrid transmission. The transmission can be an automatic transmission.

The parking lock can restrict or prevent movement of the vehicle from a parking position. For example, the vehicle on a slope can be prevented from moving. The parking lock can be connected to the transmission. The parking lock can be arranged in the transmission. The parking lock can be connected to a transmission housing of the transmission. The parking lock can be connected, for example screwed, to the transmission housing at least via the parking lock housing.

The parking lock can be actuated by an actuator. The actuator can have an electric motor, in particular a servomotor.

The parking lock housing may have a first housing wall having a first lug and the supporting element may have a first recess, wherein the first lug is received in the first recess. Starting from the first housing wall, the first lug can protrude in a direction aligned parallel to the first direction. The first lug may have a material thickness that is smaller than a recess height of the first recess. Conversely, the supporting element can also be provided with a lug and the housing wall with a recess.

The parking lock housing may have a second housing wall. Both housing walls can be mutually fixed by means of at least one spacer and enclose the supporting element.

Further advantages and advantageous embodiments result from the description of the figures and the drawings.

BRIEF DESCRIPTION OF THE DRAWINGS

The parking lock is described in detail below with reference to the drawings. Specifically.

DETAILED DESCRIPTION

Figure 1:
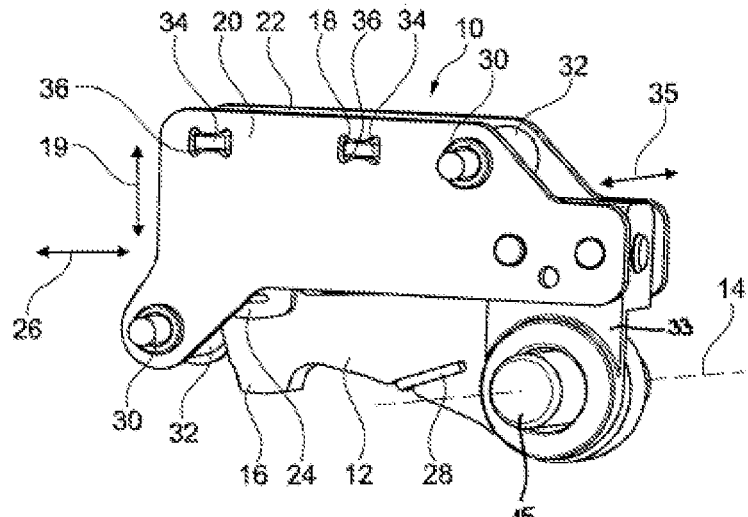
FIG. 1 shows a three-dimensional view of a parking lock in a first embodiment.

FIG. 1 shows a parking lock 10 having a locking pawl 12 which can be rotated about a rotational axis 14. When the locking pawl 12 is rotated, a ratchet 16 formed in one piece therewith moves essentially along the radial direction 19 with respect to the main transmission shaft (not shown). The parking lock 10 is intended for installation in a vehicle transmission of a motor vehicle and causes a fixing of a parking lock wheel (not shown), which is connected to the main transmission shaft in a rotationally fixed manner. For this purpose, the parking lock wheel has a locking toothing system arranged on the outer circumference thereof, in which the ratchet 16 can be locked in a form-fitting manner.

The locking pawl 12 is held by a return spring 28, which prevents the locking pawl from being inadvertently locked against the parking lock wheel in the unloaded state due to gravity.

The parking lock 10 also has a first housing wall 20 and a second housing wall 22, which are arranged as plate parts parallel to one another. Both housing walls 20, 22 are spaced apart from one another by a plurality of, in the present case two, spacer sleeves 32. As a hollow cylinder, the spacer sleeves 32 simultaneously enable the parking lock 10 to be fastened to the transmission (not shown), by means of the screws 30 and thus assume a double function. Together with the axle 15 supporting the locking pawl 12, the two spacer sleeves 32 form an approximately right-angled triangle. For this purpose, one of the spacer sleeves 32 is arranged on the front side in front of the locking pawl 12. The parking lock 10 is therefore compact and securely supported.

The axle 15 is connected to the two housing walls 20, 22 by a spacer part 33. The one-piece spacer part 33 also separates the two housing halves 20, 22 and also forms a guide sleeve for the actuating element 24 (FIG. 3).

Figure 3:
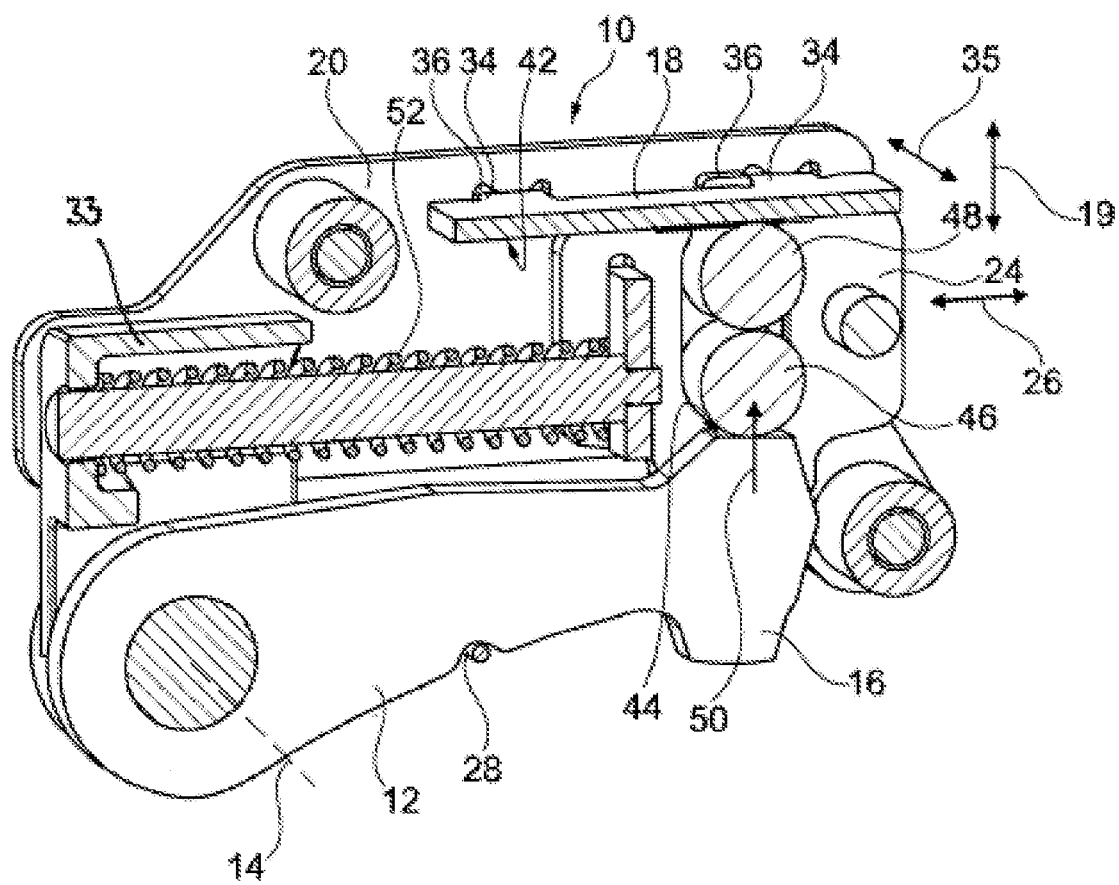
FIG. 3 shows a three-dimensional view of a cross-section through the parking lock from FIG. 1

As can be seen from FIG. 3, the actuating element 24 can be moved linearly along the axial direction 26, which runs essentially tangential to the parking lock wheel. The actuating element 24 can be displaced via an actuator in the axial direction 26 running perpendicular to the rotational axis 14 and perpendicular to the radial direction 19.

Furthermore, the parking lock 10 comprises a supporting element 18, which is received via a first housing wall 20 and a second housing wall 22. The locking pawl 12 is assigned the pawl profile 44 as a contact surface, and the supporting element 18 is assigned a counter-contact surface 42 opposite to the contact surface in relation to a radial direction 19. The supporting element 18 is designed as a raceway plate and has four lugs 34, 38. Before the parking lock is installed as a module, one of the housing walls is engaged into lug receptacles 36, 40 designed as slots. In this way, it can be plugged onto the housing wall 20, 22 from above or rotated by 90°. As a safeguard against loss, the lugs 34, 38 protruding through the supporting element 18 can be easily "flared out" so that the raceway plate cannot fall off. The lug receptacles 36, 40 have a height that corresponds at least to the plate thickness plus the tolerances to be compensated. The supporting element is guided axially with almost no play in both housing walls 20, 22 designed as side plates. The parking lock produced in this way can be fastened as a module by means of the two screws 30 in the transmission housing. As a result of the manufacturing process, dimensional fluctuations occur between the centering bores in the housing and the contact surface of the supporting element 18, which can be compensated for within the parking lock due to being arranged so as to have play.

Figure 2:
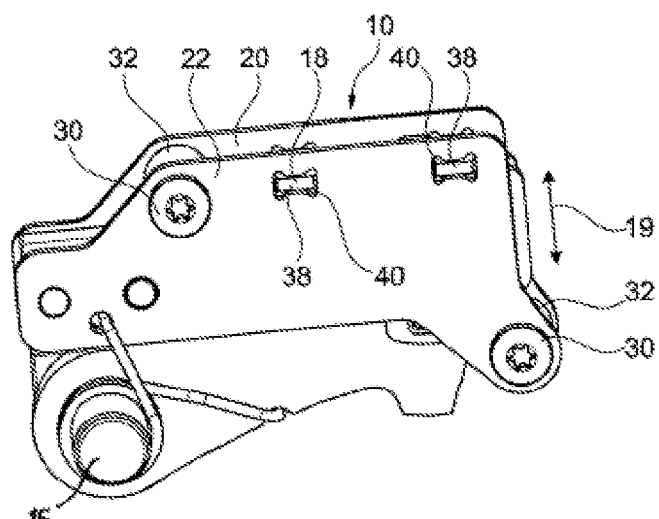
FIG. 2 shows a three-dimensional view of the parking lock from FIG. 1 from the opposite side.

FIG. 2 shows a three-dimensional view of the parking lock 10 from FIG. 1 from an opposite side. The parking lock 10 is connected to a transmission housing via the screws 30. The second housing wall 22 is fixed at a distance from the first housing wall 20 via the spacer sleeves 32. The supporting element 18 has second lugs 38 which are received in second receptacles 40 in the second housing wall 22 so as to be movable to a limited extent with respect to the radial direction 19. The lugs 34, 38 protrude in a direction 35 oriented to be perpendicular to the first direction 19.

FIG. 3 shows that the actuating unit 24 arranged between the counter-contact surface 42 of the supporting element 18 and the pawl profile 44 of the locking pawl 12 comprises a rotatable first rolling element 46 and a second rolling element 48.

The first and second rolling elements 46, 48 are in contact with one another to transmit a supporting force 50 introduced by the locking pawl 12 and directed along the first direction 19. The first rolling element 46 is in contact with the pawl profile 44 to transmit the supporting force, and the second rolling element 48 is in contact with the counter-contact surface 42 to transmit the supporting force. The first and second rolling elements 46, 48 are arranged in series between the pawl profile 44 and the counter-contact surface 42 for transmitting the supporting force 50.

The actuating unit 24 is axially displaceable in an axial direction 26 running perpendicular to the rotational axis 14 against the restoring force of a second spring element 52. If the actuating unit 24 is in a left position in relation to the axial direction 26, the locking pawl 12 is in the release position (P), in which the locking pawl 12 is moved by the first spring element 28 to the supporting element 18 in relation to the first direction 19.

If the actuating unit 24 is moved to the right from the left position, the locking pawl 12 moves into a blocking position in which the ratchet 16 is pushed away from the supporting element 18 by the first and second rolling elements 46, 48 in relation to the first direction 19. When the actuating unit 24 moves along the axial direction 26, the first and second rolling elements 46, 48 rotate and in this way roll on the contact surface 44 or the counter-contact surface 42. In this blocking position, the parking lock 10 is locked.

Figure 4:
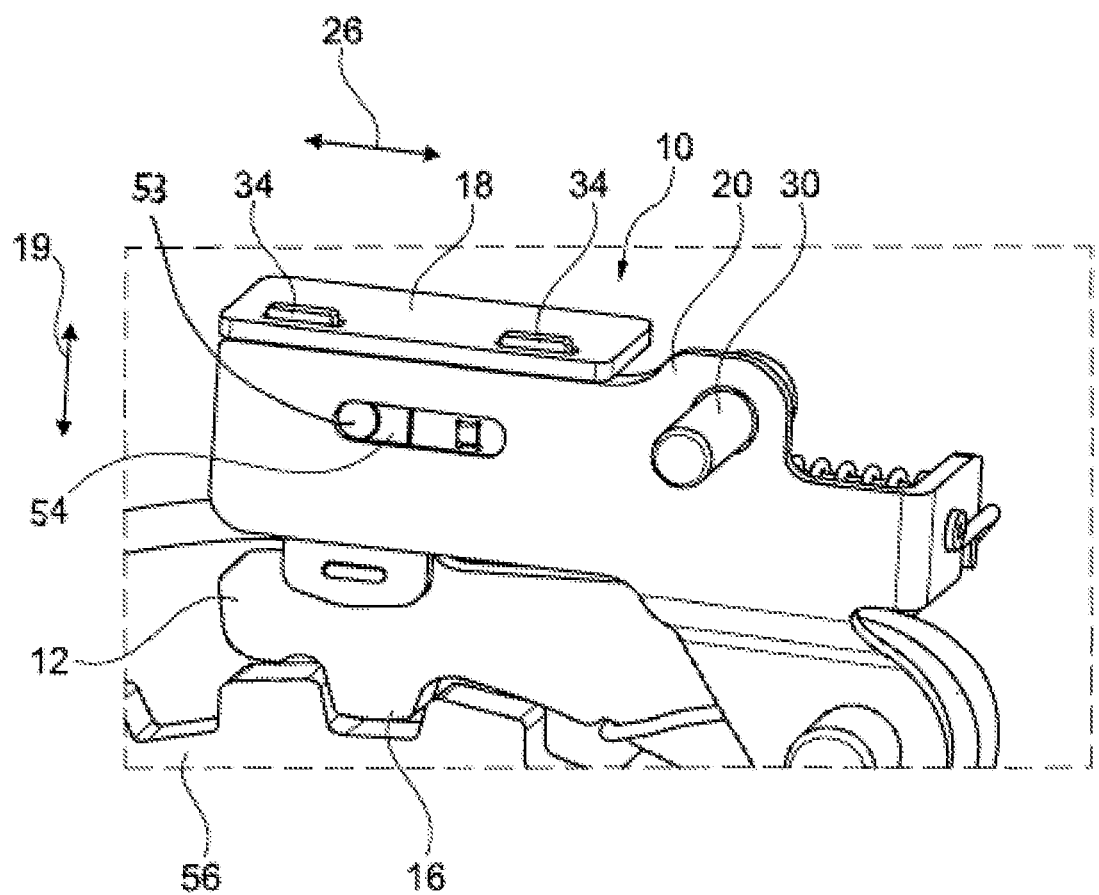
FIG. 4 shows a three-dimensional view of a parking lock in a second embodiment.

In the alternative parking lock 10 according to FIG. 4, the locking pawl 12 is in the blocking position in which the ratchet 16 is positively connected to the parking lock wheel 56.

The actuating unit 24, which can be displaced along the axial direction 26, causes the supporting force introduced by the locking pawl 12 to be passed on to the supporting element 18, which in turn supports the supporting force on a counter-holder assigned to the transmission housing.

A limitation of the movement of the supporting element 18 in the direction of the locking pawl 12 is brought about by the first housing wall 20. For this purpose, a projection 53 in the actuating element 24, which is designed as a slide, engages in an elongated hole 54 which is arranged in the first housing wall 20. A movement of the supporting element 18 in the opposite direction is not limited here, but could be made possible in that the first lugs 34 at the outer end are bent over while enabling a motion clearance of the supporting element 18 relative to the first holding element 20 along the first direction 19, and thus secure the supporting element 18 on the first holding element 20.

LIST OF REFERENCE SYMBOLS

10 Parking lock
12 Locking pawl
14 Rotational axis
15 Axle
16 Ratchet
18 Supporting element
19 Radial direction
20 First housing wall
21 Parking lock housing
22 Second housing wall
24 Actuating unit
26 Axial direction
28 Return spring
30 Screw
32 Spacer sleeve
33 Spacer part
34 First lug
36 First lug receptacle
38 Second lug
40 Second lug receptacle
42 Counter-contact surface
44 Pawl profile
46 First roller
48 Second roller
50 Supporting force
56 Parking lock wheel

The invention claimed is:

1. A parking lock comprising:
a parking lock housing,
a locking pawl which has a ratchet that can be locked in a parking lock wheel and a pawl profile arranged on a rear side of the ratchet,
an actuating unit which acts on the pawl profile to lock the ratchet in the parking lock wheel by rotating the locking pawl about a rotational axis relative to the parking lock housing,
a supporting element on which the actuating unit is supported in an engaged state,
wherein the supporting element is connected to the parking lock housing by a plurality of lugs arranged in lug receptacles so as to have play.

2. The parking lock according to claim 1, wherein the supporting element is a raceway plate.

3. The parking lock according to claim 1, wherein the supporting element is oriented in a direction of displacement of the actuating unit.

4. The parking lock according to claim 3, wherein the supporting element is connected to the parking lock housing having almost no axial play in the direction of displacement and having radial play normal to the direction of displacement.

5. The parking lock according to claim 1, wherein the actuating unit is designed as a slide having two rollers, one of the two rollers rolling on the pawl profile and another of the two rollers rolling on the supporting element.

6. The parking lock according to claim 1, wherein the parking lock housing has an elongated hole in which the actuating unit is positively guided.

7. The parking lock according to claim 1, wherein the parking lock housing has two housing walls which form a U-profile with the supporting element, which laterally frame the actuating unit and the locking pawl, and which are spaced apart from one another by a spacer.

8. The parking lock according to claim 7, wherein the spacer is hollow to accommodate a fastener for fastening the parking lock housing to a transmission.

9. A parking lock comprising:
a parking lock housing,
a locking pawl which has a ratchet that can be locked in a parking lock wheel and a pawl profile arranged on a rear side of the ratchet,
an actuating unit which acts on the pawl profile to lock the ratchet in the parking lock wheel by rotating the locking pawl about a rotational axis relative to the parking lock housing,
a supporting element on which the actuating unit is supported in an engaged state,
wherein the supporting element is connected to the parking lock housing so as to have play; and
wherein the parking lock housing has an elongated hole in which the actuating unit is positively guided.

10. The parking lock according to claim 9, wherein the supporting element is a raceway plate.

11. The parking lock according to claim 9, wherein the supporting element is oriented in a direction of displacement of the actuating unit.

12. The parking lock according to claim 11, wherein the supporting element is connected to the parking lock housing having almost no axial play in the direction of displacement and having radial play normal to the direction of displacement.

13. A parking lock comprising:
a parking lock housing,
a locking pawl which has a ratchet that can be locked in a parking lock wheel and a pawl profile arranged on a rear side of the ratchet,
an actuating unit which acts on the pawl profile to lock the ratchet in the parking lock wheel by rotating the locking pawl about a rotational axis relative to the parking lock housing,
a supporting element on which the actuating unit is supported in an engaged state,
wherein the supporting element is connected to the parking lock housing so as to have play; and
wherein the parking lock housing has two housing walls which form a U-profile with the supporting element, which laterally frame the actuating unit and the locking pawl, and which are spaced apart from one another by a spacer.

14. The parking lock according to claim 13, wherein the supporting element is a raceway plate.

15. The parking lock according to claim 13, wherein the supporting element is oriented in a direction of displacement of the actuating unit.

16. The parking lock according to claim 15, wherein the supporting element is connected to the parking lock housing having almost no axial play in the direction of displacement and having radial play normal to the direction of displacement.

* * * * *